(12) United States Patent
Bernauer et al.

(10) Patent No.: US 7,927,139 B2
(45) Date of Patent: Apr. 19, 2011

(54) ELECTRICAL LEADTHROUGH MODULE AND METHOD FOR PRODUCTION THEREOF

(75) Inventors: Johann Bernauer, Tiefenbach (DE); Jakob Rauchensteiner, Landshut (DE)

(73) Assignee: Schott AG (DE)

( * ) Notice: Subject to any disclaimer, the term of this patent is extended or adjusted under 35 U.S.C. 154(b) by 0 days.

(21) Appl. No.: 12/335,622

(22) Filed: Dec. 16, 2008

(65) Prior Publication Data

US 2009/0156040 A1 Jun. 18, 2009

(30) Foreign Application Priority Data

Dec. 17, 2007 (DE) .......... 10 2007 061 174

(51) Int. Cl.
*H01R 13/40* (2006.01)
(52) U.S. Cl. .......... 439/589; 439/935
(58) Field of Classification Search .......... 439/824, 439/700, 935, 589
See application file for complete search history.

(56) References Cited

U.S. PATENT DOCUMENTS

| | | | | |
|---|---|---|---|---|
| 3,803,531 | A | * | 4/1974 | Sorensen ............ 439/190 |
| 4,540,230 | A | * | 9/1985 | Iversen et al. ......... 439/277 |
| 4,653,839 | A | * | 3/1987 | Powell ............... 439/660 |

FOREIGN PATENT DOCUMENTS

| | | |
|---|---|---|
| DE | 1 972 545 U | 11/1967 |
| DE | 1490332 A1 | 1/1969 |
| DE | 1640495 A1 | 12/1971 |
| DE | 28 24 637 C2 | 3/1982 |
| DE | 9419407 U1 | 2/1995 |
| DE | 44 32 982 C2 | 7/1998 |
| DE | 102 02 901 A1 | 8/2002 |
| DE | 10 2006 021 621 A1 | 11/2007 |
| FR | 2637133 A1 | 3/1990 |
| GB | 2198295 A | 6/1988 |

OTHER PUBLICATIONS

Robert Hermann, "European Patent Application No. EP 08 02 1135 Search Report", Apr. 6, 2009, Publisher: EPO, Published in: EP.
German Office Action, German Patent Office, dated Jun. 23, 2008.
Wigner, "German Application No. 10 2007 061 174.0-55 Office Action", Sep. 28, 2009, Publisher: Deutsches Patent-Und Markenamt, Published in: DE.

* cited by examiner

*Primary Examiner* — Ross N Gushi
(74) *Attorney, Agent, or Firm* — DeMont & Breyer, LLC

(57) ABSTRACT

In order to connect together the conductors of the leadthroughs of an electrical leadthrough module in a dependable and simple manner, the invention specifies an electrical leadthrough module that comprises at least two separated electrical leadthroughs, each with at least one conductor passing through an insulating element and protruding on both sides of the insulating element, wherein the conductors of the electrical leadthroughs are connected electrically together by a rod arranged to be axially displaceable with respect to the conductors.

21 Claims, 4 Drawing Sheets

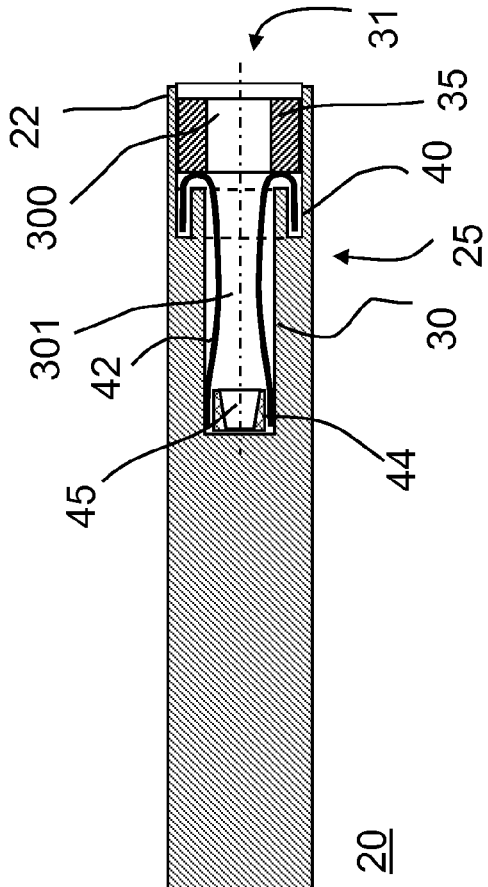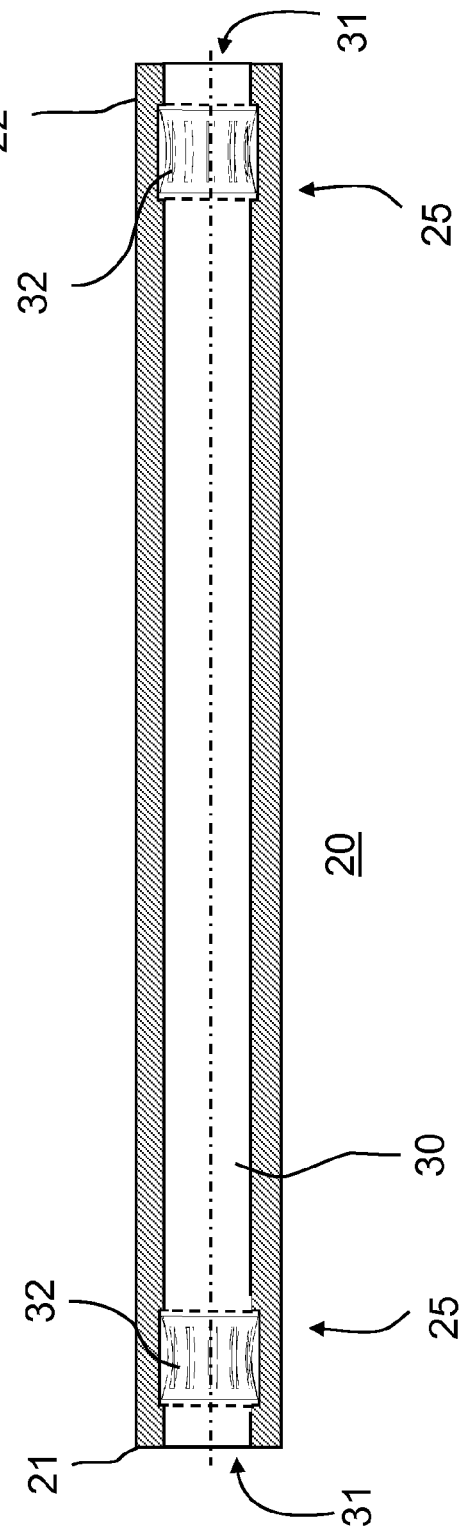
Fig. 2
Fig. 3

ELECTRICAL LEADTHROUGH MODULE AND METHOD FOR PRODUCTION THEREOF

FIELD OF THE INVENTION

The invention pertains in general to electrical leadthroughs, and in particular to electrical leadthroughs for pressure vessels or safety vessels, engine leads, housing leads and container leads.

BACKGROUND OF THE INVENTION

In order to satisfy maximum requirements in the operating safety of safety vessels, for example, reactor containments or other pressure vessels and other power lead-ins to supply power and for passage of control and measuring signals, often electrical leadthroughs and leadthrough modules are used in this field and have, in the case of elevated safety requirements, two or a plurality of mutually spaced electrical leadthroughs cabled together one behind the other, with one or a plurality of conductors passing through an insulating element. The leadthroughs are held in a supporting element, generally made of metal, but also of plastic. In general, two such leadthroughs are used that are spaced apart and are cabled together.

Previously, the conductors of the electrical leadthroughs of such leadthrough modules were electrically connected together by cables. In order to join the conductors to the leadthroughs, crimp-connections and screw-connections were used. But this manner of connecting has several disadvantages. The connection is laden with "bugs," takes up a lot of space and above all cannot be disconnected without destruction. Crimp casings and cables have to be tailored carefully to each other. In addition, this type of electrical contacting of the conductors is also very expensive and labor-intensive. This is particularly important when one such leadthrough module, which is quite common, has far more than one-hundred connections in which the conductors are each to be connected together.

SUMMARY OF THE INVENTION

Therefore the invention is based on the problem of specifying a leadthrough module in which the conductors of the leadthroughs can be securely connected together and in which the connecting is easy to implement.

Accordingly, the invention provides for an electrical leadthrough module comprising at least two distanced electrical leadthroughs, each with at least one conductor passing through an insulating element and protruding on both sides of the insulating element, wherein the conductors of the electrical leadthroughs are connected electrically together by a connecting element that is axially displaceable with respect to the conductor(s) of at least one of the leadthroughs.

The method for production of one such leadthrough module accordingly is based on the fact that at least two electrical leadthroughs each with at least one conductor passing through an insulating element and protruding on both sides of the insulating element, are electrically connected together by a connecting element arranged so as to be axially displaceable with respect to the conductors.

Specifically, the electrical leadthrough module is designed preferably as follows: at least two electrical leadthroughs are provided, wherein each of the leadthroughs comprises a flange with at least one axial opening, in which a glass insulating element is fused-in so that it seals hermetically, wherein several conductors are provided, said conductors being sealed in the glass insulating element passing through the glass insulating element and extending on both sides of the insulating element, wherein the conductors of the electrical leadthroughs align in pairs with their longitudinal axes, viewed in the axial direction, are spaced axially, and are connected electrically together by an electrically conducting element arranged in an axially displaceable manner with respect to the conductors of at least one of the leadthroughs, wherein electrical contacting is created with each socket contact, and wherein between the insulating elements, a space surrounding the connecting element is hermetically enclosed.

The corresponding method for production of one such leadthrough is based on producing at least two electrical leadthroughs, wherein each of the leadthroughs comprises a flange with at least one axial opening, in which a glass insulating element is fused-in so that it seals hermetically, wherein several conductors passing through the glass insulating element and extending on both sides of the insulating element are sealed in the glass insulating element, and wherein the leadthroughs are arranged so that the conductors of the electrical leadthroughs align in pairs with their longitudinal axes, viewed in the axial direction, and are electrically connected together, each by one socket contact, by an electrically conducting connecting element arranged in an axially displaceable manner with respect to the conductors of at least one of the leadthroughs, and wherein during assembly the two leadthroughs are pushed together in the axial direction and thus the electrically conducting connecting elements are displaced in the axial direction along the conductors contacted by the connecting elements, such that the leadthroughs are secured at an axial separation so that between the insulating elements a space surrounding the connecting elements is hermetically enclosed. Due to the axially displaceable contacts, no particular expense is needed now for contacting of the conductors. Rather, the leadthroughs are combined so that the conductors are aligned axially and thus the electrical contact is established by the receptacles. Therefore, the contacting takes place simultaneously with the joining of the leadthroughs.

In general one single glass insulating element per conductor can be used, or even a plurality of conductors can be sealed within a common insulating element.

A connecting element can comprise in particular an axially displaceable, preferably rigid rod.

In order to establish the electrical contacting, the connecting element in one particularly preferred embodiment of the invention comprises a socket or a socket contact, for example as a component of the rod mentioned above.

Because the conductors of the rod arranged as axially displaceable with respect to the conductors are electrically connected to each other at a spacing, a uniformly stable arrangement is obtained in comparison to the previously known cables. Also, the connection of the conductors with the rods can be produced much more easily and in a space-saving manner. This applies in particular to those electrical leadthroughs with several electrical conductors. If a rod is used as connecting element, then the conductor(s) of the leadthroughs can be equipped on one or both sides with receptacles in which the axially displaceable rod is held. In particular, the conductors of both leadthroughs can each have a receptacle in which a rod is mounted as an axially displaceable connecting element.

According to another design embodiment of the invention, even the rods can be omitted, depending on the length of the leadthrough module. In this case, the invention provides that a leadthrough conductor is provided at the connecting site as socket contact with a spring-like contact element and the conductor of the second leadthrough arranged at an axial spacing, in particular axially to the leadthrough conductor, makes an axial sliding contact in this socket.

The leadthrough module according to this invention is particularly suitable for carrying of higher electrical power, particularly for high voltage and/or medium voltage. In this case, the conductors of the leadthroughs will each have a diameter of at least 5 mm.

Previously, for electrical leadthroughs in safety vessels, screwed or crimped contacts were used for reasons of operating safety. Particularly with leadthroughs designed for high currents starting at 10 amps, and/or medium voltage (usually voltages in the range of 1 to 30 kV are considered to be medium voltage), a screwed or a crimped connection ensures a low-resistance, dependable electrical contact over the long term. In the case of high currents, a notable contact resistance would lead to strong heating, which in turn increases the contact resistance. An uncertain electrical contact can thus quickly result in failure of the leadthrough.

In order to establish a dependable contacting for high electrical power even with axially sliding socket contacts, according to one embodiment of the invention, crown- or basket-shaped, spring contact elements can be used. In these crown-shaped contact elements, the individual spring elements are arranged so that a plurality of contact sites is produced along a ring-shaped contact region.

For example, the sockets can be attached first to the conductors of one of the leadthroughs and then the conductors of the other leadthrough can be contacted in one step by means of axially sliding on the sockets. Thus, even a rod as connecting element can have a receptacle on at least one of the ends thereof. However, it is also possible for one conductor of the leadthrough to already have one such integrated receptacle. At any rate, in all these cases a connection is established with at least one of the conductors by means of a receptable connection.

It is also particularly useful for the leadthroughs to be spaced apart in the axial direction of the conductors in order to allow installation into a wall of the vessel, so that the conductor(s) of the one leadthrough are accessible from the outside and the conductor(s) of an additional leadthrough are accessible within the vessel.

One additional advantage in comparison to flexible cables is that any tensile loads on the conductors of one half of the leadthrough cannot be transferred to the conductors on the other half of the leadthrough.

In order to simplify the production of an electrical leadthrough module according to the invention, it is preferable that the connecting element have two ends with receptacles, or at least one of the conductors electrically connected together is designed as a receptacle and the other conductor is immersed into the socket element, so that the conductor connection of the two leadthroughs can be effected securely and permanently with one receptacle connection.

A receptacle connection also allows a movement of the rod in the axial direction. Therefore, with a connection of this kind, the displaceability of the rod in this direction is made possible through the invention. The axial displaceability is particularly advantageous in order to allow temperature-induced changes in length of the rods located between the leadthroughs, without exerting tensile- or compressive-stresses on the leadthroughs to be connected. One particularly positive side-effect is that due to the changes in length, the same location of the conductors is not always contacted, but rather the contact locations also shift slightly in the axial direction. Thus over the long term, any oxidation on the conductor surfaces is prevented, so that no deterioration or even breaking of the electrical contact will occur between conductors of the leadthrough and of the electrical connection according to the invention established with the rigid rod to a conductor of the other leadthrough.

Furthermore, a great amount of space can be saved if the receptacle is located in the axially-running hole at the end of the rod. Thus, the receptacle can be very favorably designed as an integral constituent of the rod. In particular this means that a separate receptacle part need not be set onto the rod, but rather that the rod is designed as a single piece with terminal-side openings for the axially-running holes in which the contact element(s) are arranged.

Now, as defined in the invention, a rod is not exclusively a massive object. Rather, the rod herein should be understood in general as a rigid connecting element. One such connecting element according to an additional design embodiment of the invention can also be comprised as tube or rod, or one tube or rod, or several such tubular or rod-shaped elements.

Longitudinally displaceable contacts, in particular also connected to receptacles, can be attained in a favorable manner by contacting of the connecting element with the conductor by means of a lamella contact and/or a wire spring contact. Both contacts can be designed as crown or basket format, as mentioned above, in order for the leadthrough to be suitable for high electrical power.

Furthermore, a fixed mechanical connection of the at least two leadthroughs is desirable. In order to achieve this, the insulating elements of the leadthroughs can be connected to a single tubular element. Because the electrical leadthroughs are attached in a single tubular element, a fixed connection is created between the leadthroughs, wherein one or several rods are braced in the interior of the tubular element between the conductors. The assembly of the electrical leadthrough module is made easier if the tubular element is composed of several parts that are connected together. The connection herein can be established by screwing and/or welding.

For leadthroughs with several conductors, it is a further advantage if the leadthroughs each have a plurality of conductors, wherein the conductors of at least one of the leadthroughs pass through and are supported on a common insulating element. This allows a very dense arrangement of the conductors. Owing to the invented contacting by rods, which can be easily plugged into the conductors, the result is that there is no problem in joining of the electrical leadthrough module even in a dense arrangement.

Electrical leadthroughs are particularly preferred in which the insulating elements each comprise a glass insulation in which at least one conductor of the leadthrough is sealed during its manufacture. Glass as insulating material has particularly long-term resistance and is hermetically tight and temperature-resistant. In order to also seal the edges of the leadthrough hermetically, the glass insulation can also be sealed, preferably in a metal casing.

BRIEF DESCRIPTION OF THE DRAWINGS

The invention will be explained in greater detail below based on design embodiments and with reference to the attached figures. The same reference numbers are used to identify the same or similar parts.
Shown are.

DETAILED DESCRIPTION

Figure 1:
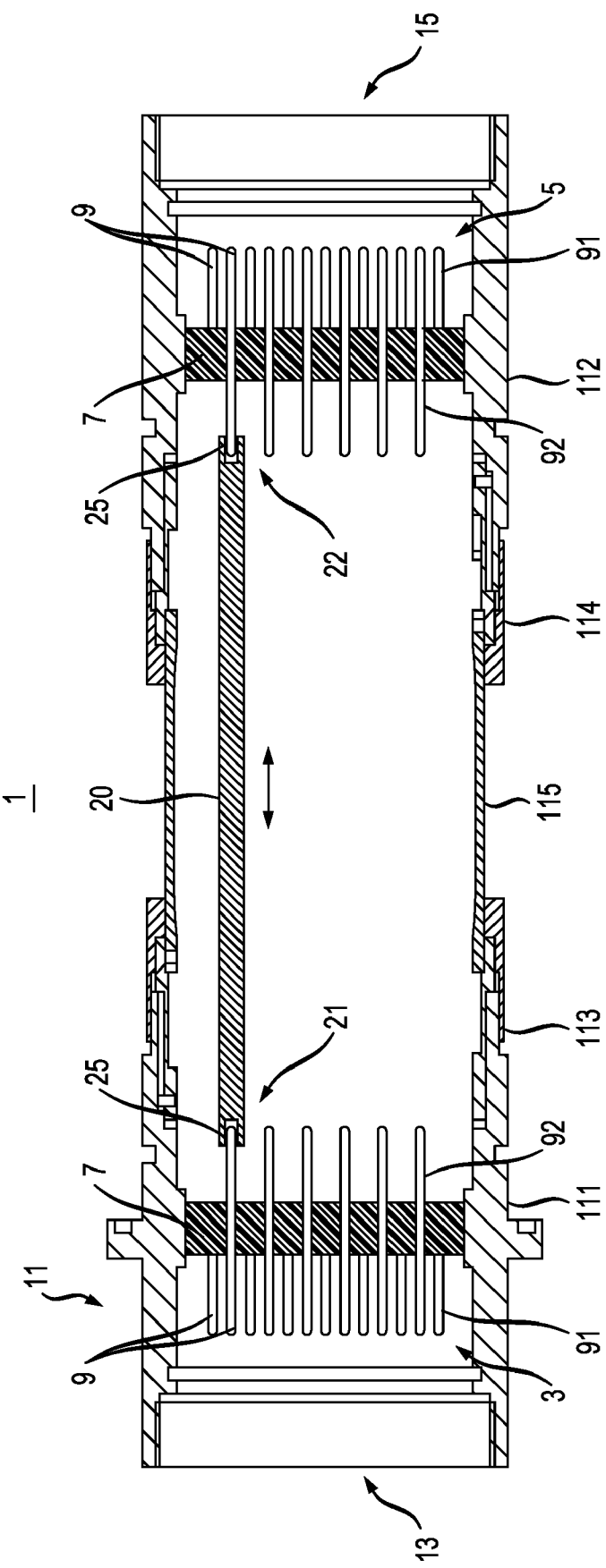
FIG. 1 a cross-sectional view of one design embodiment of an electrical leadthrough module according to the invention,
FIG. 2 a cross-sectional view of a rod with wire spring contacts for a leadthrough module according to the invention, FIG. 3 one variant of the rod shown in FIG. 2, designed as a tube and with lamella contact, FIG. 4 one variant of the design embodiment shown in FIG. 1, in which the leadthrough conductors of one leadthrough are arranged at the connecting site as leadthrough contact with spring-like contact element, FIG. 5 one design embodiment of the leadthrough module with directly connected electrical leadthroughs.

FIG. 1 shows in cross-sectional view, portions of one design embodiment of an electrical leadthrough module according to the invention designated overall by reference number 1. The electrical leadthrough module 1 is composed of two spaced electrical leadthroughs 3, 5 each with a plurality of conductors 9 passing through an insulating element 7 and protruding on both sides of the insulating element 7. The leadthrough module 1 is designed for high electrical power. In this regard, the conductors 9 have a diameter of at least 5 mm. The parts of the conductor 9 protruding from the insulating element 7 form internal connection ends 92 and external connection ends 91, wherein the internal connection ends 92 of the conductors 9 of the two electrical leadthroughs 3, 5 are arranged opposite each other and pointing toward each other.

The insulating elements 7 are each designed as common insulating elements for all conductors of one leadthrough 3, 5. In particular, the insulating elements in this embodiment are glass insulators in which the conductors 9 of the leadthroughs are sealed together spaced apart.

The leadthroughs 3, 5 are arranged at a spacing from each other in the axial direction of the conductor 9 and are secured in a tubular element 11. This tubular element 11 is composed of several parts 111, 112, 113, 114, 115 joined together, and the parts 111 and 112 form metal casings; in each casing, one or several glass insulations 7 of the leadthroughs 3, 5 are sealed. The parts 111, 112, 113, 114 can be screwed together and/or welded together, for example. The volume formed in the tubular element between the two leadthroughs is hermetically enclosed.

The external connecting ends 91 of the conductor 9 are accessible through the terminal openings 13, 15 of the element 11. The leadthrough module 1 is then installed into a thick-wall pressure vessel or safety vessel so that one of the openings 13, 15 is accessible inside the safety vessel and the other opening is accessible from the outside, in order to be able to cable the outer connection ends 91 on both sides and thus to establish electrical connections in the interior of the safety vessel.

The mutual contact between opposing conductors 9 of the two leadthroughs 3, 5 separated axially with respect to the conductors 9, is obtained according to the invention in that the conductors 9 of the electrical leadthroughs 3, 5 are connected together by an electrically conducting rod 20 as connecting element, which is arranged so as to be axially displaceable with respect to the conductors 9. The displaceability in the axial direction or along the conductor 9 is indicated based on the double arrow illustrated at the rod 20.

Each pair of opposing conductors 9 of the leadthroughs 3, 5 is connected to one such rod. However, for simplicity, FIG. 1 presents only one individual rod 20 that contacts two conductors 9 with each other.

The axially displaceable attachment of the rod 20 to the conductors takes place by means of receptacle connectors. The two ends 21, 22 of the rod 20 thus each have one receptacle 25, which is plugged onto the inner connecting end 92 of one conductor 9 during assembly of the leadthrough module.

To produce one such leadthrough module, accordingly, the two electrical leadthroughs 3, 5 are produced, wherein each of the leadthroughs comprises a flange with at least one axial opening in which the insulating element is fused-in and hermetically sealed, and several conductors 9 passing through the insulating element 7 and protruding on both sides of the insulating element 7 are sealed in the insulating element 7.

The leadthroughs 3, 5 are then arranged so that the conductors 9 of the electrical leadthroughs 3 align in pairs with their longitudinal axes, viewed in the axial direction, and are electrically connected together by an electrically conducting connecting element arranged in an axially displaceable manner with respect to the conductors of at least one of the leadthroughs, said connecting element being here in the form of the conducting rods with socket contacts. In this case, during the assembly, the two leadthroughs are moved together in the axial direction and are secured to the tubular element at the axial separation, wherein the gap is preferably hermetically sealed. During the joining process, the receptacles of the rods are displaced in the axial direction along the conductors 9.

FIG. 2 shows a more detailed view of one such rod 20 with receptacles 25. The receptacles located at both ends of the rod 20 are an integral part of the one-piece rod 20. In this regard, axially running holes 30 with terminal openings 31 are created in the ends 21, 22 of the rod 20. In this design embodiment of the invention, the rod 20 has wire spring contacts for contacting of the conductors 9 of the leadthroughs. With this rod 20, the conductors 9 are contacted with the wire spring contacts of the receptacles 25 located at the ends 21, 22 of the rod 20.

The receptacles respectively comprise axially running holes 30. These holes have a first section 300 that opens into the opening 31, and a following section 301 that extends out to the hole end of the holes 30 created as blind bores in the embodiment shown in FIG. 2. In a ring-shaped pouch 40, the respective ends of a plurality of wire springs 42 are arranged, which extend into the rear section 301 and are attached to the interior end of the hole 30 by a clamp element 44. Attachment of the clamp element 44 can occur, for example, by insertion and expansion of the clamp element 44, in that a conical pin is pressed into the opening 45 of the clamp element 44, so that the clamp element will expand. In order to prevent falling-out of the wire springs, alternatively or additionally a short piece of pipe 35 can be installed into the section 300 of the hole 30.

FIG. 3 shows a variant of the rod 20 illustrated in FIG. 2. In this variant, the rod 20 is not a massive piece, but rather is designed as a tube with a hole 30 going all the way through. Lamella contacts 32 are used for the contacting.

Figure 4:
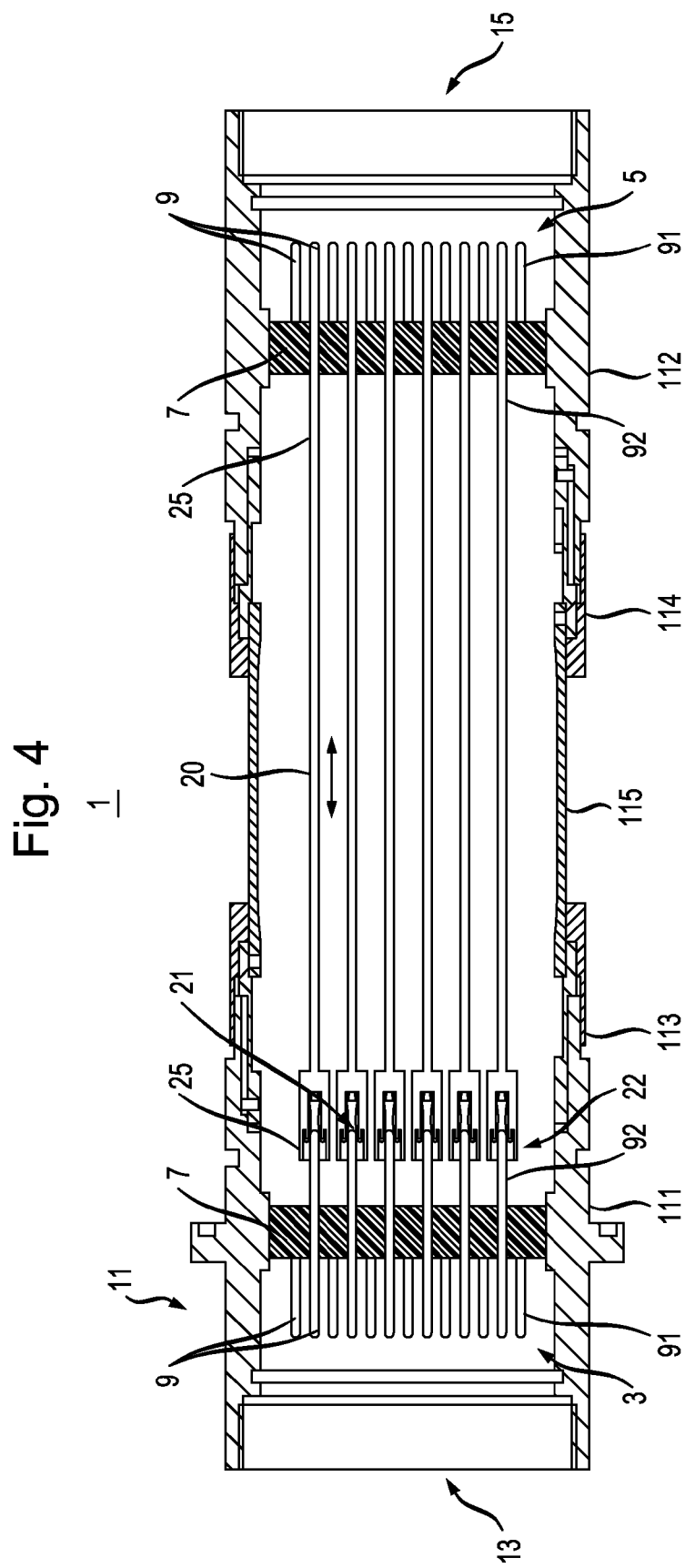

FIG. 4 shows a variant of the design embodiment presented in FIG. 1. In this variant, the two leadthroughs are not connected by means of a rod as connecting element, but rather are directly connected together electrically. To do so, the conductors 9 of the leadthrough 5 are arranged at the electrical connecting site of the conductors 9 of the two leadthroughs 3, 5 as receptacle 25 with spring contact element. For example, these receptacles can be designed as axially displaceable connecting elements corresponding to the rod shown in FIG. 2. The conductors 9 of the leadthroughs 3 axially arranged with respect to the conductors 9 of the leadthrough 5 at an axial spacing, respectively, make axial sliding contact in one of the receptacles 25. In particular, the receptacles are integrated into the conductors 9 of the leadthrough 5.

This design is particularly suitable for short leadthrough modules. All design embodiments share in common that the two leadthroughs in the final, assembled leadthrough module are fixed in place with respect to each other, but also in the assembled leadthrough module, one leadthrough conductor of one leadthrough is electrically contacted with one leadthrough conductor of the other leadthrough by means of an electrically conducting connecting element that can slide in the axial direction of one of the leadthrough conductors of at least one of the leadthroughs.

Figure 5:
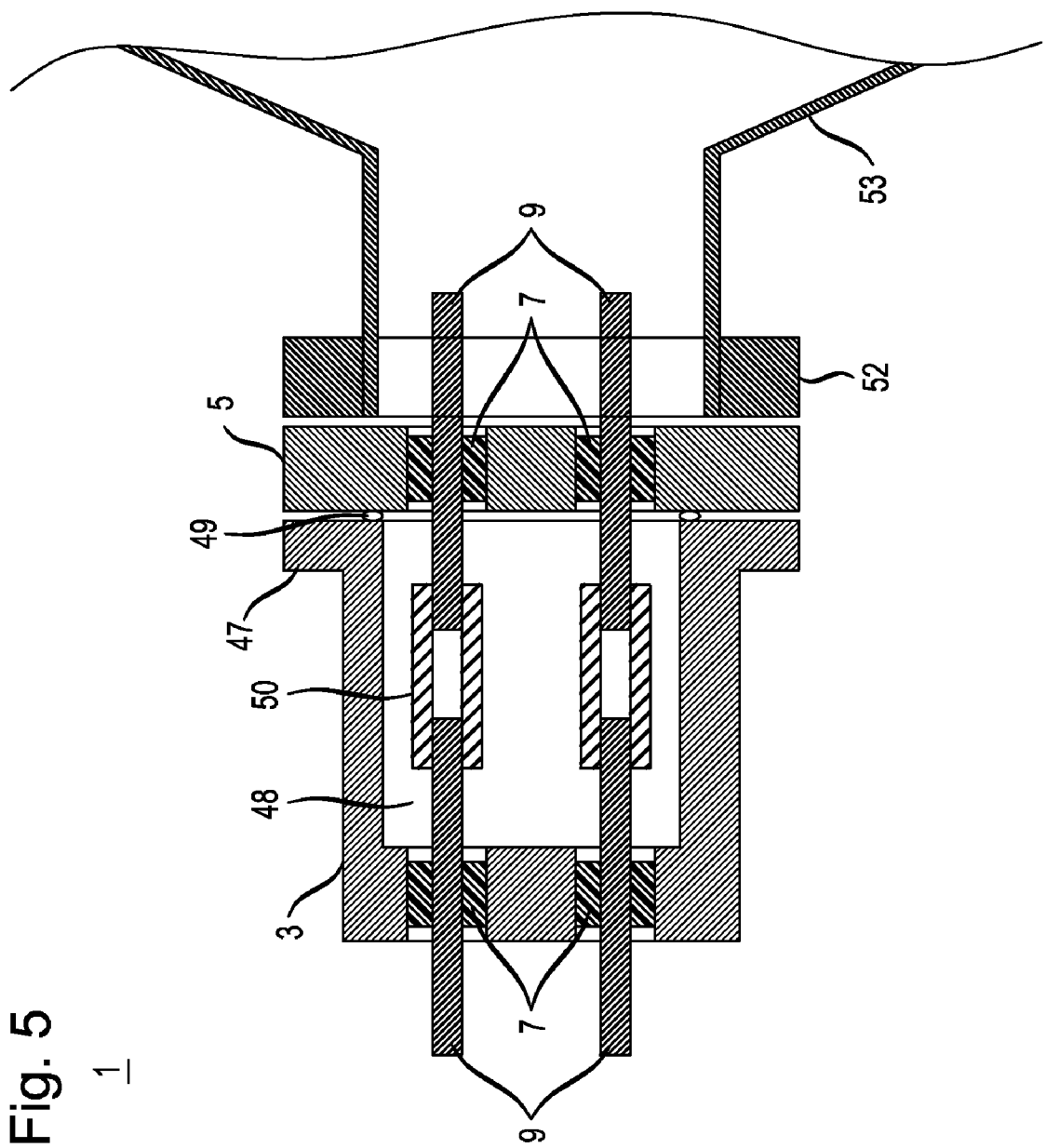

It is evident to the person skilled in the art that the element 11 of the design embodiment of a leadthrough module shown in FIG. 1 can also have another shape adapted to the particular application; thus it need not be tubular. Also, the two leadthroughs 3, 5 according to an additional design embodiment of the invention can also be connected together directly. To produce a cavity that surrounds and has hermetically enclosed the inside of the conductor, one or both of the leadthroughs 3, 5 can be hat-shaped. One such example is shown in FIG. 5. In this embodiment, the leadthrough 3 has a hat shape, whereas the leadthrough 5 is designed as an essentially disk-shaped flange. The crimp 47 of the hat-shaped leadthrough 3 forms an attachment flange with which the leadthrough 3 and leadthrough 5 are screwed together. A ring gasket 49 ensures a hermetic seal of the enclosed gap 48. The axially aligned conductors 9, as in the previous examples, can also have a receptacle connection or be connected to a rod 20. In the illustrated example, double receptacles 50 are used as an alternative. These can have receptacles on both sides, for example, in the style of the wire spring and/or lamella contacts arranged in a crown shape as shown in the examples in FIGS. 2 and 3.

Of course, in this design embodiment of the invention, the leadthroughs are set directly onto each other; however, here too, as in the preceding examples, the pairs of contacting conductors are spaced in the axial direction.

The leadthrough module 1 shown in FIG. 5 is among other things quite suitable to be flanged around flange openings of safety vessels. Shown in FIG. 5 is an example in which the flange 5 of the leadthrough module 1 is flanged to the connection flange of a safety vessel 53.

It is clear for the person skilled in the art that the invention is not restricted to the previously described embodiments. In fact, the embodiments can be modified in many ways and can be combined with one another.

What is claimed is:

1. An electrical leadthrough module comprising:
    a first electrical leadthrough and a second electrical leadthrough, axially separated in relation to each other, each having at least one conductor passing through an insulating element and protruding on both sides of the insulating element, wherein the conductors of the first and second electrical leadthroughs are connected electrically together by a connecting element that is in contact with a first conductor of at least one of the first and second electrical leadthroughs only alongside the first conductor, so that the connecting element is axially displaceable with respect to the first conductor when the first and second electrical leadthroughs are both secured in a tubular element.

2. The electrical leadthrough module according to claim 1, wherein the connecting element comprises an axially displaceable rod.

3. The electrical leadthrough module according to claim 2, wherein each of the first and second electrical leadthroughs comprises a flange with at least one axial opening, in which a glass insulating element is fused-in so that it seals hermetically, wherein several conductors are provided, said conductors passing through the glass insulating element and extending on both sides of the insulating element and being sealed in the glass insulating element, wherein the conductors of the electrical leadthroughs align in pairs with their longitudinal axes, viewed in the axial direction, being spaced axially and connected electrically together by an electrically conducting element arranged in an axially displaceable manner with respect to the conductors of at least one of the first and second electrical leadthroughs, wherein the electrical contacting is created with each leadthrough contact, and wherein between the insulating elements a space surrounding the connecting element is hermetically enclosed.

4. The electrical leadthrough module according to claim 2, characterized in that the conductors of the first and second electrical leadthroughs each have a diameter of at least 5 mm.

5. The electrical leadthrough module according to claim 2, characterized in that a socket connector is arranged in a hole at the end of the rod.

6. The electrical leadthrough module according to claim 2, characterized in that the connecting element comprises a lamella contact.

7. The electrical leadthrough module according to claim 2, characterized in that the connecting element comprises a wire spring contact.

8. The electrical leadthrough module according to claim 2, characterized in that the first and second electrical leadthroughs each have a plurality of conductors, wherein for at least one of the first and second electrical leadthroughs, the conductors pass through a common insulating element.

9. The electrical leadthrough module according to claim 2, characterized in that the connecting element comprises one or a plurality of rods in a tubular or rod shape.

10. A pressure vessel leadthrough or leadthrough for a safety vessel equipped with the electrical leadthrough module according to claim 2.

11. The electrical leadthrough module according to claim 1, wherein the conductors of the first electrical leadthrough are designed as axially displaceable receptacles, so that the conductors of the second electrical leadthrough make axial sliding contact in one of said receptacles.

12. The electrical leadthrough module according to claim 11, wherein each of the first and second electrical leadthroughs comprises a flange with at least one axial opening, in which a glass insulating element is fused-in so that it seals hermetically, wherein several conductors are provided, said conductors passing through the glass insulating element and extending on both sides of the insulating element and being sealed in the glass insulating element, wherein the conductors of the first and second electrical leadthroughs align in pairs with their longitudinal axes, viewed in the axial direction, being spaced axially and connected electrically together by an electrically conducting element arranged in an axially displaceable manner with respect to the conductors of at least one of the first and second electrical leadthroughs, wherein the electrical contacting is created with each leadthrough contact, and wherein between the insulating elements a space surrounding the connecting element is hermetically enclosed.

13. A method for production of a leadthrough module, comprising:
    connecting together a first electrical leadthrough and a second electrical leadthrough, each leadthrough having at least one conductor passing through an insulating element and protruding on both sides of the insulating element, wherein the connecting occurs mechanically by a tubular element and electrically by a connecting element that is arranged so as to be axially displaceable with respect to the conductors after the first and second electrical leadthroughs have been connected to each other by the tubular element, and such that the connecting element contacts a first conductor of at least one of the first and second electrical leadthroughs only alongside the first conductor.

14. The method according to claim 13, wherein the first and second electrical leadthroughs are connected together at a spacing from each other by means of a rod arranged so as to be axially displaceable with respect to the conductors.

15. The method according to claim 14, further comprising producing the first and second electrical leadthroughs, wherein each of the first and second electrical leadthroughs comprises a flange with at least one axial opening, in which a glass insulating element is fused-in so that it seals hermetically, wherein several conductors are provided, said conductors passing through the glass insulating element and extending on both sides of the insulating element and being sealed in the glass insulating element, and wherein the leadthroughs are arranged so that the conductors of the first and second electrical leadthroughs align in pairs with their longitudinal axes, viewed in the axial direction, and are electrically connected together, each by one leadthrough contact, by an electrically conducting connecting element arranged in an axially displaceable manner to the conductors of at least one of the first and second electrical leadthroughs, and wherein during assembly the first and second electrical leadthroughs are pushed together in the axial direction and thus the electrically conducting connecting elements are displaced in the axial direction along the conductors contacted by the connecting elements, such that the leadthroughs are secured at an axial separation so that between the insulating elements a space surrounding the connecting elements is hermetically enclosed.

16. The method according to claim 14, characterized in that one or a plurality of conductors of the first electrical leadthrough is connected to a socket connector integrated at an end of a conductor to be connected therewith.

17. The method according to claim 14, characterized in that a conductor of the first electrical leadthrough is electrically connected to a socket connector formed within a hole at the end of the rod.

18. The method according to claim 14, characterized in that at least one of the conductors of the first electrical leadthrough is contacted by a lamella contact or by a wire spring contact.

19. The method according to claim 14, characterized in that the first and second electrical leadthroughs each have a plurality of conductors that pass through a common insulating element and one conductor of the first electrical leadthrough is respectively electrically connected by a rod to one conductor of the second electrical leadthrough.

20. The method according to claim 13, wherein the first and second electrical leadthroughs are connected together at a spacing from each other by using an axial sliding contact of the conductors of the second electrical leadthrough in receptacles of the conductors of the first electrical leadthrough, said receptacles being designed to be displaceable.

21. The method according to claim 20, further comprising producing the first and second electrical leadthroughs, wherein each of the electrical leadthroughs comprises a flange with at least one axial opening, in which a glass insulating element is fused-in so that it seals hermetically, wherein several conductors are provided, said conductors passing through the glass insulating element and extending on both sides of the insulating element and being sealed in the glass insulating element, and wherein the first and second electrical leadthroughs are arranged so that the conductors of the first and second electrical leadthroughs align in pairs with their longitudinal axes, viewed in the axial direction, and are electrically connected together, each by one leadthrough contact, by an electrically conducting connecting element arranged in an axially displaceable manner to the conductors of at least one of the first and second electrical leadthroughs, and wherein during assembly the first and second electrical leadthroughs are pushed together in the axial direction and thus the electrically conducting connecting elements are displaced in the axial direction along the conductors contacted by the connecting elements, such that the first and second electrical leadthroughs are secured at an axial separation so that between the insulating elements a space surrounding the connecting element is hermetically enclosed.

* * * * *